United States Patent [19]

Weimer et al.

[11] 4,365,167
[45] Dec. 21, 1982

[54] SWITCHOVER SYSTEM FOR BINARY LOAD CONTROL

[75] Inventors: Günther Weimer, Gerlingen; Henning Becker, Schönaich, both of Fed. Rep. of Germany

[73] Assignee: Centra-Bürkle GmbH & Co., Schönaich, Fed. Rep. of Germany

[21] Appl. No.: 276,660

[22] Filed: Jun. 23, 1981

[30] Foreign Application Priority Data

Jun. 25, 1980 [DE] Fed. Rep. of Germany ....... 3023753

[51] Int. Cl.³ .................. F23N 5/20; G05D 23/00
[52] U.S. Cl. .................. 307/66; 236/46 R; 236/47; 307/117; 307/141
[58] Field of Search ............ 236/46 R, 47; 307/66, 307/117, 141

[56] References Cited

U.S. PATENT DOCUMENTS 3,948,441  4/1976  Perkins et al. ............ 307/66 X
4,319,711  3/1982  Barker et al. ............ 236/46 R

*Primary Examiner*—Michael L. Gellner
*Attorney, Agent, or Firm*—Karl F. Ross

[57] ABSTRACT

A system for alternately activating and deactivating a load comprises a high-resistance d-c circuit branch connected across a power supply downstream of a load-operating impedance, this branch including a voltage limiter and a voltage multiplier in series with each other and with a switching stage responsive to commands from a timer and/or a parameter sensor such as a thermostat. The junction of the voltage limiter and the voltage multiplier is connected to one input of a differential amplifier whose other input is energized with either of two potentials, respectively higher and lower than that of the junction, by the switching stage. The amplifier output controls a variable-resistance element, such as a transistor of the bipolar or the MOSFET type, connected across the high-resistance branch to form a current path in series with the load-operating impedance, the resistance of this path being variable between a high value minimizing the flow of load current and a low value sufficient to maintain the switching stage operational. A standby source may be provided for keeping the switching stage or at least an electric timer thereof energized during interruptions of the main power supply.

10 Claims, 5 Drawing Figures

SWITCHOVER SYSTEM FOR BINARY LOAD CONTROL

FIELD OF THE INVENTION

Our present invention relates to a system for controlling the energization of a load-operating impedance element connected across a d-c or a-c power supply, e.g. an electromagnetic switch designed to activate and deactivate a heating or air-conditioning plant in response to changes in room temperature.

BACKGROUND OF THE INVENTION

The intermittent energization of such load-operating impedance elements may be controlled by diverse command means responsive to one or more variables such as temperature and/or time. U.S. Pat. No. 3,948,441 to Perkins et al., for example, describes a two-wire circuit including a thermostatic switch whose set point is periodically changed by a timing mechanism in order to maintain different mean room temperatures by day and at night. Such a time-dependent variation in the operating point of a switch responsive to an external parameter could also be based on seasonal rather than diurnal changes, if desired.

In a system of this nature it is of course necessary that the thermostatic or other command means (possibly including a timer) remain operational even during OFF periods of the controlled load impedance. Thus, the above-identified Perkins et al. patent teaches the provision of a storage battery which is charged from the supply when the thermostatic switch is open and which supplies the timing mechanism with the necessary operating energy.

OBJECT OF THE INVENTION

The object of our present invention is to provide, in a system of the type referred to, means for obviating the need for such a battery (except possibly for standby purposes) while insuring continued operation of a switching stage controlling the alternate cut-in and cutout of an associated load impedance in a two-conductor circuit, i.e. without the requirement for additional wiring to energize that switching stage.

SUMMARY OF THE INVENTION

In accordance with out present invention, such a switching state is part of a high-resistance d-c circuit branch connected in series with the controlled load-operating impedance element, this branch including a voltage limiter energizing an input of a voltage multiplier which in turn energizes the switching stage. The latter has an output carrying a potential whose absolute magnitude is higher in a first operational state and is lower in a second operational stage of this stage than the absolute magnitude of the maximum output voltage of the voltage limiter. A differential amplifier has a first input connected to the voltage limiter in parallel with the input of the voltage multiplier and has a second input connected to the output of the switching stage for emitting a binary switchover signal depending on the operational state of that stage, this stage being altered by command means responsive to a control variable. We further provide variable-resistance means, coupled to the differential amplifier and responsive to the switchover signal thereof, connected across the high-resistance branch in series with the controlled impedance element for providing a low-resistance current path in one operational state and a high-resistance current path in the other operational state, thereby causing the impedance element to be traversed by a relatively large load current in the first instance and by a relatively small load current in the second instance. Even in the first-mentioned operational stage, however, the voltage drop across the variable-resistance means and thus across the low-resistance current path is sufficient to maintain the energization of the switching stage.

The variable-resistance means of finite minimum resistance may be a field-effect transistor, preferably an enhancement-type MOSFET, though a bipolar transistor could also be used especially when the ratio between the load-operating current and the quiescent current is relatively low.

If the power supply is an alternating-current generator, both the high-resistance d-c branch and the variable-resistance means coupled to the differential amplifier may be connected across an output diagonal of a full-wave rectifier bridge inserted between the controlled impedance element and the voltage limiter.

BRIEF DESCRIPTION OF DRAWING

The above and other features of our invention will now be described in detail with reference to the accompanying drawing in which.

SPECIFIC DESCRIPTION

Figure 1:
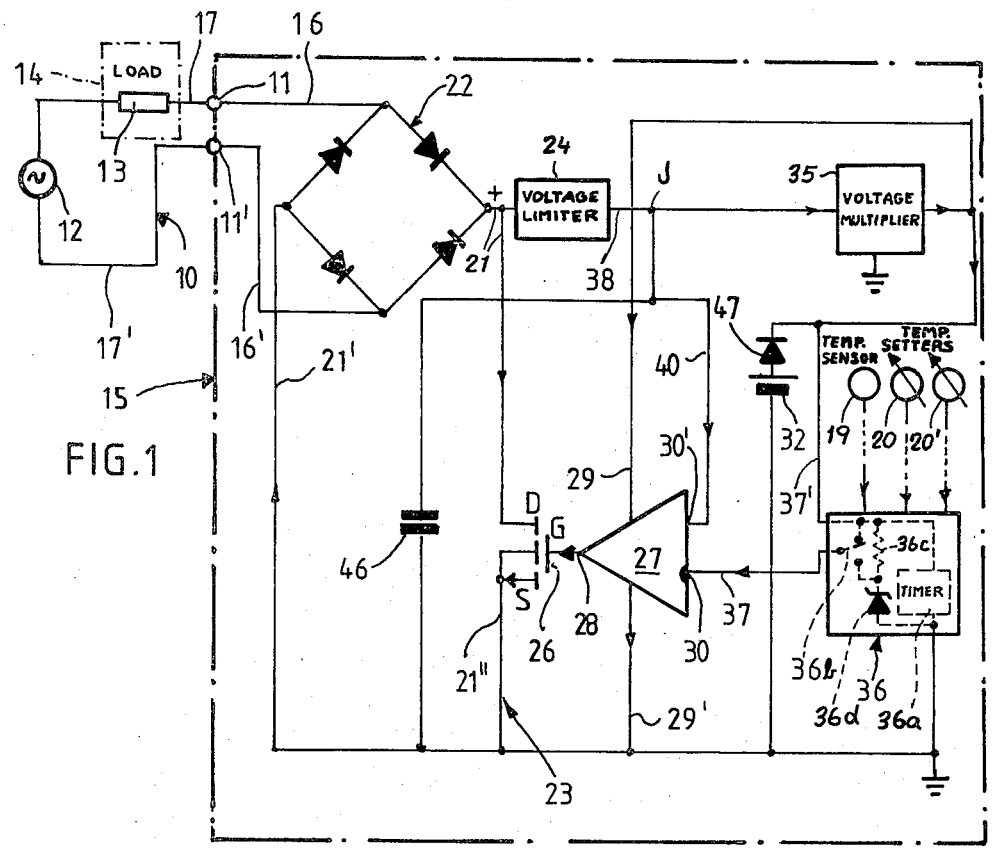
FIG. 1 is a circuit diagram (partly in block form) of a control system embodying our invention.

In FIG. 1 we have shown a circuit 10 for the intermittent operation of a load 14 with the aid of an ohmic and/or inductive impedance element 13, e.g. an electromagnetic switch, connected in that circuit in series with a power supply 12. The latter is a source of alternating current, such as the usual 110-V utility mains or the secondary of a step-down transformer generating 24–36 V, for example. Power supply 12 has two output leads 17 and 17', the former including the impedance element 13. Leads 17 and 17' are tied by respective junctions 11 and 11', such as plug-and-jack connectors, to a pair of input leads 16 and 16' of a full-wave rectifier bridge 22 having a positive output lead 21 and a grounded negative output lead 21'.

Bridge 22 forms part of a control unit 15 which includes an enhancement-type n-channel metal-oxide-silicon field-effect transistor or MOSFET 26 connected across its output diagonal, with a drain D tied to lead 21 and a source S grounded via another lead 21''. MOSFET 26 and its drain and source leads constitute a variable-resistance circuit branch 23.

A high-resistance circuit branch connected in parallel with branch 23 across the output diagonal of bridge 22 includes a voltage limiter 24 with an output lead 28 extending to an input of a voltage multiplier 25. A junction point J on lead 38 is connected by way of a lead 40 to a noninverting input 30' of a differential amplifier 27, preferably a high-gain operational amplifier, whose energizing circuit includes two wires 29 and 29' respectively connected to the output of voltage multiplier 35 and to ground lead 21'. An extension 37' of wire 29 feeds the output voltage of multiplier 35 to a signal generator 36 from which an output lead 37 extends to an inverting input 13 of amplifier 27; this amplifier has an output 28 delivering a binary switchover signal to the insulated gate G of MOSFET 26.

Signal generator 36 includes a timer 36a, preferably a crystal-controlled digital electronic clock, together with a switching stage schematically represented by a relay armature 36b which in its illustrated position directly interconnects the leads 37 and 37'; in its alternate position, armature 36b connects the inverting input 30 of amplifier 27 to a tap of a voltage divider which supplies the lead 37 with a positive potential substantially lower than that of lead 37'. The voltage divider is shown as comprising a current-limiting resistor 36c in series with a Zener diode 36d. Signal generator 36 is further provided with programmable command means including a temperature sensor 19 and two manually settable thermostats 20, 20'; one or the other of these thermostats is always enabled by the timer 36a to reverse the relay armature 36b when the room temperature measured by sensor 19 falls below or rises above the corresponding set point, depending on whether the system is used for heating or for cooling. Such a mode of operation is well known per se, e.g. from the aforementioned U.S. Pat. No. 3,948,441.

The output voltage of limiter 24, appearing on lead 38, is stabilized by a capacitor 46 inserted between junction J and ground. FIG. 1 also shows a battery 32 lying in series with a diode 47 between leads 37' and 29'; the terminal voltage of this battery is less than the output voltage of multiplier 35 so that diode 47 is blocked and battery 32 will not discharge under normal operating conditions. If, however, the power supply 12 should fail, the battery will maintain the timer 36a operating. This timer could also serve for the control of other equipment not shown.

When diode 47 is omitted, battery 32 can be designed as an accumulator adapted to be charged from voltage multiplier 35 during normal operation.

In the illustrated position of armature 36b, the output voltage of multiplier 35 (which preferably lies in a range of 2 to 4 V) is directly applied to the inverting input 30 of amplifier 27 whose noninverting input 30' receives the necessarily lower input voltage of that multiplier, i.e. the output voltage of limiter 24. Amplifier 27 is thereby cut off so that the channel resistance of MOSFET 26 is high. Since the branch circuit including limiter 24 and multiplier 35 also have a high input resistance, only a small current is drawn through impedance element 13; this current suffices to operate the circuit components 24, 35 and 36 but is insufficient to trigger the element 13 into activating the load 14. If that load is a burner of a heating plant, for example, this situation will continue until the room temperature detected by sensor 19 falls below the set point of whichever of the two thermostats 20 and 20' happens to be activated by timer 36a. When that happens, switch 36b is reversed and feeds to amplifier input 30 a voltage which is a fraction of the output voltage of multiplier 35 and is less than the voltage applied to noninverting input 30'. As a result, amplifier 27 conducts so that the binary switchover signal applied by its output 28 to gate G goes positive and sharply lowers the channel resistance of MOSFET 26.

With path 23 now in its low-resistance state, a current sufficient to turn on the load 14 traverses the impedance element 13. In light of the large voltage drop now appearing across this element, the output voltage of bridge 22 is reduced with resulting lowering of the potential of junction J until it approaches the threshold voltage of Zener diode 36d whereby a state of equilibrium is established. The residual channel resistance of MOSFET 26 at this point is still high enough to keep the branch circuit 24, 35, 36 operational without the intervention of standby battery 32.

After the desired room temperature has been established, or possibly upon a changeover to the other thermostat for nighttime or holiday operation, armature 36b returns to its previous position and lowers the output signal of amplifier 27 to its near-zero level. This restores the aforedescribed situation in which the load 14 had been deactivated.

Figure 2:
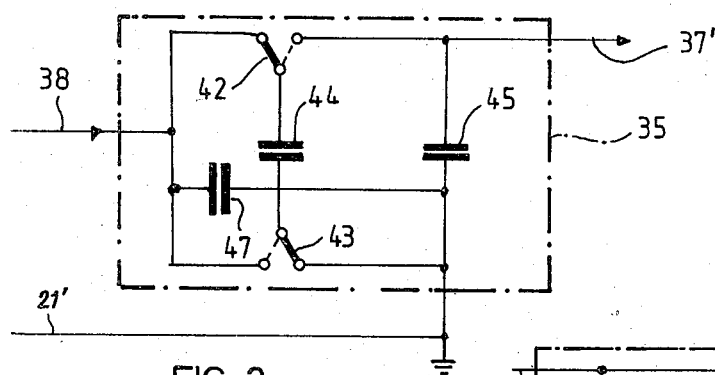
FIG. 2 shows details of a voltage multiplier included in the system of FIG. 1.

Multiplier 35 may be simply a voltage doubler of the type shown in FIG. 2. This device comprises a blocking capacitor 44 inserted between two electronic switches 42 and 43 acting as polarity inverters, these switches being controlled by a free-running multivibrator (not shown) so as to alternate at a high frequency—e.g. of 30 KHz—between the full-line and dotted-line positions. In the full-line position the upper plate of capacitor 44 is connected to input lead 38 while its lower plate is grounded whereby that capacitor is charged to the output voltage of limiter 24; in the dotted-line position the lower plate of capacitor 44 is connected to input lead 38 while its upper plate is joined to output lead 37' whereby the voltage of its previously acquired charge is added to the input voltage of the multiplier. The output and input voltages are stabilized by a pair of shunt capacitors 45 and 47 inserted between ground and leads 37' and 38, respectively.

Figure 3:
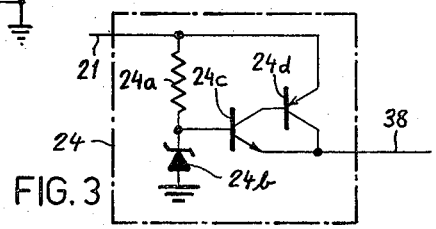
FIG. 3 shows details of a voltage limiter forming part of the system of FIG. 1.

In FIG. 3 we have shown a possible structure for voltage limiter 24 which comprises a resistor 24a connected in series with a Zener diode 24b between lead 21 and ground; the anode of the Zener diode is tied to the base of an NPN transistor 24c whose collector is connected in a Darlington configuration to the base of a PNP transistor 24d. The emitter of transistor 24d is joined to input lead 21 while its collector, together with the emitter of transistor 24c, is joined to output lead 38. As long as the input voltage on lead 21 exceeds the threshold of Zener diode 24b, its output voltage on lead 38 substantially corresponds to the level of that threshold; resistor 24a minimizes the current flow through the Zener diode in this condition so that component 24 also acts as a current limiter. When the voltage on lead 21 falls below the threshold, the output lead 38 experiences a corresponding voltage drop. If transistors 24c and 24d are omitted, the limiter will be substantially identical with the voltage divider of signal generator 36 except for a slightly higher threshold voltage of Zener diode 24b compared with that of Zener diode 36d.

By way of example, the maximum output voltage of limiter 24 may be 1.5 V corresponding to a value approximately 1.8 times as high (i.e. about 2.7 V) for the output voltage of multiplier 35. In the cut-in position of armature 36b, the voltage delivered to amplifier input 30 may be 1.4 V; the residual voltage drop between drain D and source S of MOSFET 26 will then be of the same order of magnitude while a considerably larger voltage drop exists across impedance element 13 which is traversed by the load-operating current. If standby battery 32 has a terminal voltage not exceeding the threshold of 1.4 V, it will not be drained by Zener diode 36d during failure of power supply 12 and will only drive the timer 36a.

As a protection against short-term supply interruptions we may use a large-capacitance storage condenser (e.g. of 10 fd) in lieu of battery 32 and diode 47. As will be apparent from FIG. 2, shunt capacitor 45 could serve as such a storage condenser on being suitably dimensioned.

The system of FIG. 1 could obviously be modified in various ways, e.g. with replacement of the n-channel MOSFET 36 by a p-channel MOSFET, reversal of the polarity of rectifier bridge 22 and corresponding changes in other circuit components.

Figure 4:
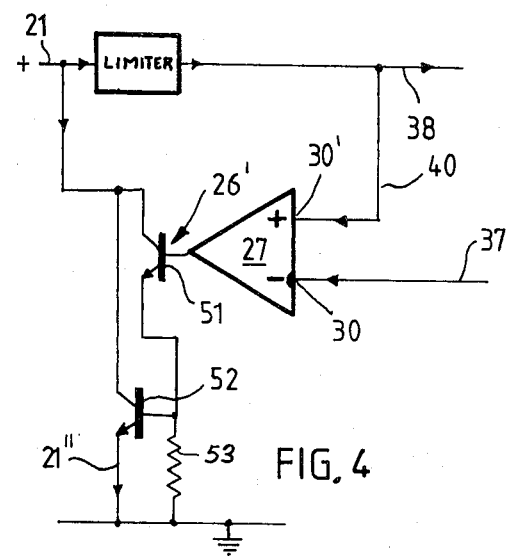
FIGS. 4 and 5 illustrate partial modifications of the circuitry of FIG. 1.
Figure 5:
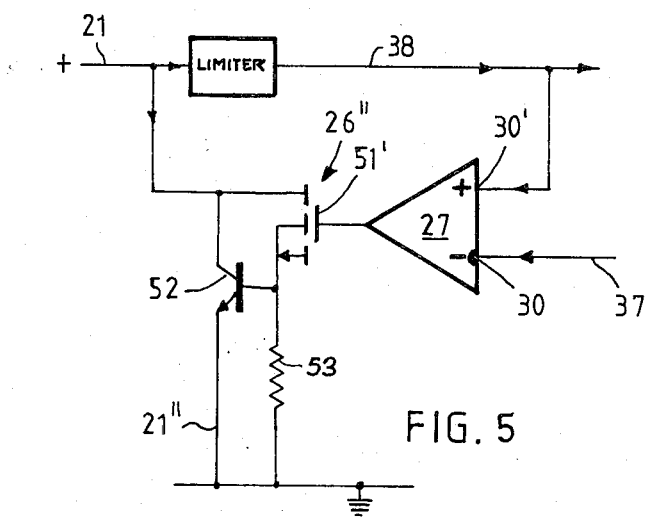

The use of MOSFET 26 as a variable-resistance component affords a high power amplification so that a change by only 1 or 2 volts in the potential of lead 37 establishes a wide swing in the current drawn from supply 12. When a lesser amplification is acceptable, the MOSFET 26 may be replaced by bipolar transistor means 26' as shown in FIG. 4, e.g. a pair of NPN transistors 51 and 52 connected in a Darlington configuration. FIG. 5 shows another variable-resistance network 26" in which the NPN transistor 52 of FIG. 4 is controlled by a MOSFET 51' for an increased amplification ratio; in this case the MOSFET can be of simpler and therefore cheaper construction than the MOSFET 36 of FIG. 1 which is traversed by the main load current. A resistor 53 limits the current flow through the pilot stage 51 of FIG. 4 or 51' of FIG. 5.

It will be understood that the grounded conductor 21' of FIG. 1 need not be a wire but may be represented by any conductive structure (e.g. a housing or a substrate). This also applies when power supply 12 is a source of direct rather than alternating current, eliminating the need for rectifier bridge 22.

Most of the components of control unit 15 can be readily accommodated on an integrated-circuit chip or a conductor plate. The temperature sensor 19 and setters 20, 20', of course, need not be disposed in close proximity to the other circuit elements but may be installed at any convenient location. Such a unit, moreover, may be utilized for a variety of purposes other than room-temperature regulation, including for example the control of industrial furnaces, machine tools and conveyors in response to external command signals.

We claim:

1. A system for controlling the energization of a load-operating impedance element connected across a power supply, comprising:

a high-resistance d-c circuit branch in series with said impedance element, said branch including a voltage limiter, a voltage multiplier with an input energized by said voltage limiter and a switching stage energized by said voltage multiplier, said switching stage having an output carrying a potential whose absolute magnitude is higher than that of the maximum output voltage of said voltage limiter in a first operational state and is lower than that of said maximum output voltage in a second operational state thereof;

a differential amplifier having a first input connected to said voltage limiter in parallel with the input of said voltage multiplier and having a second input connected to the output of said switching stage for emitting a binary switchover signal depending on the operational state of said switching stage;

command means connected to said switching stage for altering the operational state thereof in response to a control variable;

and variable-resistance means coupled to said differential amplifier and responsive to said switchover signal connected across said branch in series with said impedance element for providing a low-resistance current path in one operational state and a high-resistance current path in the other operational state of said switching stage, thereby causing said impedance element to be traversed by a relatively large load current in said one operational state and by a relatively small load current in said other operational state, the voltage drop across said low-resistance current path being sufficient to maintain the energization of said switching stage in said one operational state.

2. A system as defined in claim 1 wherein said differential amplifier is a high-gain operational amplifier.

3. A system as defined in claim 1 or 2 wherein said power supply is a generator of alternating current, further comprising a full-wave rectifier bridge inserted between said impedance element and said voltage limiter, said variable-resistance means being connected across an output diagonal of said rectifier bridge.

4. A system as defined in claim 1 or 2 wherein said variable-resistance means comprises a field-effect transistor with a gate connected to the output of said differential amplifier.

5. A system as defined in claim 4 wherein said field-effect transistor is an enhancement MOSFET.

6. A system as defined in claim 4 wherein said variable-resistance means further comprises a bipolar transistor connected in parallel with and controlled by said field-effect transistor.

7. A system as defined in claim 1 or 2 wherein said variable-resistance means comprises a pair of bipolar transistors connected in a Darlington configuration.

8. A system as defined in claim 1 or 2 wherein said voltage limiter comprises a resistor in series with a Zener diode.

9. A system as defined in claim 1 or 2 wherein said voltage multiplier comprises a pair of shunt capacitors and a high-frequency polarity changer in series with a blocking capacitor between said shunt capacitors.

10. A system as defined in claim 1 or 2 wherein said command means includes an electric timer driven by said voltage multiplier, further comprising a standby d-c source connected across the output of said voltage multiplier for maintaining said timer operated upon an interruption of said power supply.

* * * * *